United States Patent [19]

Fitko et al.

[11] 4,156,672

[45] May 29, 1979

[54] METHOD FOR PREPARING DISPERSIONS OF PROPYLENE POLYMERS

[75] Inventors: Chester W. Fitko, Chicago; Joseph T. Khamis, Naperville, both of Ill.

[73] Assignee: The Continental Group, Inc., New York, N.Y.

[21] Appl. No.: 890,437

[22] Filed: Mar. 27, 1978

[51] Int. Cl.$^2$ ................................................ C08K 5/01
[52] U.S. Cl. ............................ 260/33.6 PQ; 260/34.2
[58] Field of Search ....................... 260/33.6 PQ, 34.2

[56] References Cited

U.S. PATENT DOCUMENTS

| | | | |
|---|---|---|---|
| 2,966,474 | 12/1960 | Jurgeleit | 260/34.2 |
| 3,475,369 | 10/1969 | Blunt | 260/33.6 PQ |
| 3,483,276 | 12/1969 | Mahlman | 260/33.6 PQ |
| 3,971,749 | 7/1976 | Blunt | 260/33.6 PQ |

*Primary Examiner*—Lewis T. Jacobs
*Attorney, Agent, or Firm*—Paul Shapiro; Joseph E. Kerwin; William A. Dittmann

[57] ABSTRACT

Stable dispersions of propylene polymer resins which can be fused to form smooth, uniform, pinhole-free coatings are prepared by admixing the resin in particulate form having a median diameter of 0.1–50 microns with an organic liquid having a boiling point above 300° F. and a density approximately equal to the resin, the resin being insoluble and dispersible in the liquid at room temperature and soluble in the liquid at temperatures above 350° F.

7 Claims, No Drawings

METHOD FOR PREPARING DISPERSIONS OF PROPYLENE POLYMERS

BACKGROUND OF THE INVENTION

1. Field of Invention

This invention relates generally to preparing stable dispersions of propylene polymers.

2. The Prior Art

U.S. Pat. No. 3,616,047 teaches sealing the pour opening of easy opening containers with a propylene polymer layered closure member. The closure member is generally a laminate of the propylene polymer resin and a metal foil such as aluminum foil which is heat sealed by its propylene polymer layer to the surface of an end panel coated with a bond promoting layer of a carboxyl modified polypropylene resin. The carboxyl modified polypropylene layer is also used as a bonding layer in the lamination of the propylene polymer to the aluminum foil to prepare the closure member.

Although the propylene polymer closures of U.S. Pat. No. 3,616,047 can be effectively bonded to the end panel to seal the container, problems arose in the application of the carboxyl modified polypropylene layer to the enameled metal surface as well as in preparing the propylene polymer/aluminum foil laminate.

When the carboxyl modified polypropylene resin was utilized as an adhesion promoting layer for laminating the propylene polymer to the aluminum foil layer or to bond the laminate to the metal can end, application of the carboxyl modified polypropylene resin as a coating layer required that the resin be applied as a dispersion in an organic liquid such as kerosene. In order to obtain a dispersion of commercial utility a resin having a particle size of 0.1 to 5 microns was required. At the present time, the resin in such a small particle size range is a relatively expensive material. Further, coating application of the resin as a dilute kerosene dispersion, e.g., 10% solids, was found unsatisfactory as it did not have the required physical properties, such as viscosity and flow out, which are required in conventional coating equipment, e.g., as by roll coating. To obtain a coating dispersion having the physical properties necessary for commercial coating application, polypropylene resin powders of approximately the same particle size range as the carboxyl modified polypropylene, e.g., 0.1-5 microns, were incorporated in the dispersion to raise the solids content to about 20%, whereby the dispersion had the flow and viscosity characteristics required in commercial coating applications. The drawback to the use of polypropylene resins of such particle size was that polypropylene resin of particle sizes less than 5 microns is difficult to manufacture and is presently in limited commercial supply.

U.S. Pat. No. 3,483,276 teaches applying mixtures of polypropylene and carboxyl modified polypropylene as coatings dispersed in xylene. Xylene has a density of 0.86 grams/cubic centimeter (g/cc) and a boiling point of 280°–290° F. When it is attempted to prepare a xylene dispersion of the carboxyl modified polypropylene resin, the dispersion is unstable and the resin separates from the dispersion on standing overnight. When the resin is applied to a metal substrate from a xylene dispersion and then baked to effect removal of the xylene, unsatisfactory flow-out and coalescence of the resin occurs with the result that the coating layer applied to the substrate is rough and lacks integrity, i.e., the coating coverage is incomplete.

SUMMARY OF THE INVENTION

In accordance with the present invention, stable dispersions of propylene polymer resins and particularly carboxyl modified propylene polymer resins having the physical properties suitable for application using commercial coating equipment are obtained by dispersing the resin, having a particle size of 0.5–50 microns, in an organic liquid having a density approximately equal to the density of the resin, the resin being dispersible but insoluble in the liquid at room temperature but soluble in the liquid at temperatures about 350° F.

By the practice of the present invention, dispersions of propylene polymers are obtained which are stable for prolonged time periods, e.g., 2 months or more, are readily applied to substrates using conventional coating equipment and exhibit excellent flow-out properties when applied.

PREFERRED EMBODIMENTS

The term "propylene polymer" as used herein includes within its meaning homopolymers and copolymers of propylene including graft copolymers such as polypropylene, propylene-ethylene copolymers containing 1–10% by weight ethylene and carboxyl modified polypropylene resins such as the maleic acid graft copolymer of polypropylene.

Carboxyl modified polypropylene resins particularly suitable for use in the practice of the present invention are prepared by grafting an unsaturated dicarboxylic acid or anhydride onto a polypropylene backbone using high energy radiation or a peroxy catalyst as described in U.S. Pat. No. 3,483,276. Unsaturated dicarboxylic acids or anhydrides which can be employed to prepare the carboxyl modified polypropylene resins include maleic, fumaric and itaconic acids and their anhydrides, maleic anhydride being preferred.

The amount of unsaturated dicarboxylic acid or anhydride grafted onto the polypropylene backbone ranges from about 0.50 to about 10% by weight based on the total weight of the grafted polymer. The amount of carboxyl groups in the grafted polymer ranges from about 0.1 to about 5.0% by weight and preferably about 0.5 to 4.0% by weight. These carboxyl modified polypropylene resins generally have a density in the range of 0.901–0.908 grams per cubic centimeter (g/cc.). Polypropylene has a density of 0.91 g/cc.

The propylene polymer resin utilized in the practice of the present invention generally has a particle size of 0.5 to 50 microns and preferably a particle size of 35 to 40 microns. Propylene polymer resins having particle sizes in excess of 50 microns are unsuitable for use in the practice of the present invention as these particles have been found to dissolve with great difficulty when the organic liquid is raised to elevated temperatures at which the lesser sized particles readily dissolve.

The term "dispersed" or "dispersion" is used herein in the generic sense to refer to polymer which is suspended or is in emulsified form in the organic liquid vehicle.

The organic liquid which is used as the dispersant for the propylene polymer resins include any organic liquid which has a density approximately equal to the density of the propylene polymer resin, i.e., a density in the range of about 0.90 to about 0.95 g/cc. It is essential to the practice of the present invention that the organic liquid used as the dispersant have a substantial aromatic fraction as the aromatic liquid is readily absorbed by the propylene polymer and in this form is more readily dissolved when the liquid is heated at elevated temperatures above 300° F. to solubilize the resin. Generally the aromatic liquid comprises about 5 to about 99% by weight of the organic liquid used as the dispersant and preferably about 25 to about 75% by weight.

Aromatic organic liquids useful as dispersants in accordance with the practice of the present invention include aromatic hydrocarbons having 8 or more carbon atoms, a density greater than 0.90 g/cc and a boiling point greater than 350° F. Such aromatic hydrocarbons are commercially available and are generally petroleum based distillates having a boiling point range of 350°-725° F. used as solvents by the paint industry. A listing of such commercial aromatic solvents is found in the Raw Materials Index - Solvents Section, June 1968 edition, published by the National Paint, Varnish and Lacquer Association, Washington, D.C. A partial listing of such aromatic hydrocarbons is found in the Table below.

TABLE

AROMATIC HYDROCARBON SOLVENTS
(Arranged in ascending order of initial boiling point)

| Trade Name | Producer | Boiling Range °F. | Specific Gravity at 60/60° F. (g/cc) | Composition, Vol. % | | |
|---|---|---|---|---|---|---|
| | | | | Paraffins | Naphthenes | Aromatics |
| Panasol AN-1 | Amoco | 372–496 | 0.959 | | | 99 |
| Panasol AN-2 | Amoco | 393–537 | 0.976 | | | 100 |
| Ashland Hi-Sol 4-1 | Ashland | 396–490 | 0.961 | | | 99 |
| Shell Cycle Solv 74 | Shell | 415–490 | 0.901 | 10 | 4 | 86 |
| Ashland Hi-Sol 4-5 | Ashland | 440–725 | 1.010 | | | 99 |
| Ashland Hi-Sol 4-3 | Ashland | 450–545 | 0.996 | | | 99 |

Non-aromatic organic liquids useful as dispersants in the practice of the present invention include esters such as 2,2,4-trimethyldentanediol-1, 3 monoisobutyrate (density=0.945–0.955 g/cc), glycols such as diethylene glycol monoethyl ether (density=0.991 g/cc, B.P.=388°-401° F.) and glycol ethers such as diethylene glycol monomethyl ether (density=1.023 g/cc, B.P.=377°-385° F.). A more complete listing of useful non-aromatic solvents having densities above 0.90 g/cc and boiling points about 300° F. are also found in the Raw Materials Index previously mentioned.

It is an essential feature of the present invention that the organic liquid used to disperse the propylene polymer resin have a density approximately equal to that of the propylene polymer resin, i.e., generally 0.90 g/cc or more. If an organic liquid having a density appreciably less than the density of the propylene resin, e.g., kerosene (density=0.782 g/cc) or xylene (density=0.860 g/cc) is used as a dispersant vehicle for the propylene polymer resin, the resultant dispersion is unstable as the resin particles have a tendency to quickly settle out of the vehicle and redispersion of the resin is attainable only after vigorous agitation for long periods. If the density of the liquid is substantially greater than the resin powder, the resin particles float to the top of the liquid, forming a "cream" of resin which is difficult, if not impossible, to redisperse uniformly in the dispersing vehicle.

In preparing dispersions of the propylene polymer resin, the resin is added to the organic liquid at a concentration of about 5 to about 30% by weight and preferably about 10 to about 20% by weight. The mixture is then agitated to disperse the resin.

When the resin is to be coated on a substrate, a thin continuous layer of the dispersion is applied to the entire surface of the substrate at room temperature. The wet-coated substrate is heated to above 350° F. to dissolve the polymer in the solvent and thereafter to evaporate the liquid and cause the uniform flow-out and coalescence of the resin on the substrate and thereby form a continuous layer of the resin on the substrate.

It has been found that the viscosity of the dispersion can be raised appreciably if a portion of the resin dispersion is first heated to a temperature at which the resin goes into solution and the resin solution is then added to the resin dispersion at ambient or room temperature while agitating vigorously.

Antioxidants and thermal stablizers may also be incorporated in the resin coating dispersion to inhibit the oxidation of the propylene polymer resin exposed to the elevated temperature involved in the coating application. Antioxidant compounds which have been found useful in the practice of the present invention include dilaurylthiodipropionate and distearylpentaerythritol diphosphite and hindered phenolic compounds such as Irganox 1010, tetrakis (methylene 3-(3', 5' -di-tert-butyl-4-hydroxylphenyl) propionate), which are incorporated in the resin dispersion at concentrations in the range of about 0.01 to 1.0% by weight based on the solids content of the dispersion.

The propylene polymer resin dispersions of the present invention can be satisfactorily applied to substrates and particularly metal substrates by any of the conventional methods employed by the coating industry. However, for coating aluminum foil or sheet metal of the type used in container fabrication, gravure or direct roller coating are preferred methods, as the desired coating weight is easily and conveniently applied in a single coat. Spraying, dipping and flow coating are also useful methods of applying the coating formulation.

In preparing polypropylene-aluminum foil laminates, the preferred coating weight for an adhesion promoting layer of a carboxyl modified polypropylene applied to the aluminum foil is in the range of 0.3 to 1.0 milligrams of dry coating per square inch of substrate surface. After application of the carboxyl modified polypropylene layer to the aluminum foil, a propylene polymer layer in the form of a thin (1–5 mils thickness) film is bonded to the coated aluminum foil surface by heat sealing the film at a temperature range of about 350°-500° F. Thereafter, the laminate is allowed to cool to ambient temperature. Heat sealing may be accomplished by any means known to the art, such as a pressure contact of the heated surfaces between a pair of nip rolls, a heated bar or induction heating.

To illustrate the manner in which the present invention may be carried out, the following Examples are given. It is to be understood, however, that the Examples are for the purpose of illustration, and the invention is not to be regarded as limited to any of the specific materials or conditions recited therein.

EXAMPLE I

Coating dispersions of a carboxyl modified polypropylene resin were prepared by adding 15 parts Hercoprime A-35 (trademark) and 0.038 parts Irganox to an organic liquid mixture of 42.5 parts of a Heavy Aromatic Solvent (trade name) and 42.5 parts Texanol (trademark) to prepare a resin dispersion containing 15% by weight of the Hercoprime. Hercoprime A-35 is a maleic anhydride modified polypropylene resin having an inherent viscosity of about 1.7, a carboxyl content of 0.5% to 1.0%, a particle size range of 30 to 40 microns and a density of 0.91. The Heavy Aromatic Solvent had a density of 0.930 g/cc, a boiling point range of 360°–550° F. and was a mixture consisting predominately (83%) of aromatic hydrocarbons containing 8 or more carbon atoms, the remainder being saturated hydrocarbons (15%) and olefins (2%). Texanol is 2,2,4-trimethyldentanediol-1,3, monoisobutyrate having a density of 0.945–0.955 g/cc. The density of the organic liquid mixture was 0.935 g/cc.

The Heavy Aromatic Solvent and Texanol were premixed. The Irganox was added thereto followed by the Hercoprime with vigorous agitation for 20 minutes. In this way the dispersion was ready for use in application as a coating.

The so-prepared dispersion had a viscosity of 14 centipoises (cps) and did not separate after 3 months storage at room temperature.

The coating dispersion was applied to the surface of an aluminum foil (3–4 mils thickness) at room temperature at a dried film weight of 0.8 milligrams per square inch (mg/in$^2$) of metal surface. After application of the resin dispersion, the wet coated foil was baked at 450° F. for 6.5 seconds to dissolve the resin and then to volatilize the organic liquid and allow the dissolved resin to flow out on the aluminum surface to a smooth, uniform, pinhole-free coating. The carboxyl modified polypropylene coated aluminum foil while in the heated state was used to fabricate a closure member having a laminate structure wherein the coated face of the foil was bonded to a 2 mil thick polypropylene film by contacting the carboxyl modified polypropylene face of the laminate with the film between a pair of nip rolls.

The strength of the polypropylene/aluminum foil bond was determined by measuring the force required to separate a pair of polypropylene/foil laminates which were heat sealed at their polypropylene faces at 400° F., 3 seconds dwell time and 40 psi. The test was performed using an Instron peel tester which applied a constant strain rate of 12 lineal inches per minute to separate the laminate layers. It was determined that the peel forces required to separate the laminate layers were in excess of 40 pounds per lineal inch (PLI).

EXAMPLE II

The procedure of Example I was repeated to prepare two separate Hercoprime dispersions designated Dispersion "A" and Dispersion "B". These dispersions had the following compositions:

| Dispersion A | Parts |
|---|---|
| Hercoprime A-35 | 1.70 |
| Texanol | 12.30 |
| Heavy Aromatic Solvent | 22.80 |
| Irganox 1010 | 0.024 |
| Dispersion B | |
| Hercoprime A-35 | 10.30 |
| Texanol | 18.00 |
| Heavy Aromatic Solvent | 36.00 |

Dispersion A was heated to 300° F. and held at 300° F. until a clear solution was formed. The hot solution was then added slowly to Dispersion B with vigorous agitation.

The viscosity of the dispersion prepared in this manner was 510 cps. No separation of the dispersion was observed after three months storage.

When the dispersion was applied to aluminum foil at 0.3 to 1.0 mg/in$^2$ and baked at 450° F. for 6.5 seconds, a uniform pinhole-free coating was formed. Subsequent lamination of polypropylene film to the coated aluminum foil produced peel strengths in excess of 50 PLI, when the peel test of Example I was performed.

EXAMPLE III

The procedure of Example I was repeated with the exception that Hi-Sol 4-1 (trademark) was used as the organic liquid. The dispersion had the following composition:

|  | Parts |
|---|---|
| Hercoprime A-35 | 22.00 |
| Hi-Sol 4-1 | 78.00 |
| Irganox 1010 | 0.20 |

The Hi-Sol 4-1 was heated to 180° F. and the Hercoprime and Irganox was added thereto with vigorous agitation. Stirring and heating was continued for three hours. The cooled dispersion had a viscosity of 200 cps. The solids content of the dispersion was reduced to 12% solids by adding thereto 25 parts Solvesso-150 solvent. The diluted dispersion had a viscosity of 20 cps. Solvesso-150 has a boiling point range of 370°–410° F. and a specific gravity at 60/60° F. of 0.891. There was negligible separation when the product was stored at room temperature.

When the product was coated on aluminum foil and laminated to 2 mil polypropylene film, a bond of about 45 PLI was formed, when the peel test of Example I was performed.

What is claimed is:

1. A process for preparing stable dispersions of propylene polymer resin which comprises the steps of
   adding the resin in particulate form to an organic liquid having a boiling point in excess of 300° F. and a density approximating that of the resin, the organic liquid having an aromatic fraction comprising about 5 to about 99% by weight of the organic liquid, the resin having a particle size of 0.1–50 microns and being dispersible in the liquid at room temperature and soluble in the liquid at temperatures in excess of 350° F. and then admixing the resin and liquid to prepare the dispersion.
2. The process of claim 1 wherein the resin is dispersed in the organic liquid at a concentration of 10 to 30% by weight.
3. The process of claim 1 wherein the organic liquid is an aromatic hydrocarbon having 8 or more carbon atoms.
4. The process of claim 1 wherein the resin has a density in the range of about 0.90 to about 0.95.
5. The process of claim 1 wherein the resin is a carboxyl modified polypropylene.
6. The process of claim 3 wherein the aromatic hydrocarbon is a petroleum based distillate having a boiling point range of 350° to 725° F.
7. The process of claim 1 wherein the resin particle size is in the range of 35 to 40 microns.

* * * * *